US005561582A

United States Patent [19]

Geishecker et al.

[11] Patent Number: 5,561,582

[45] Date of Patent: Oct. 1, 1996

[54] FAILSAFE DEVICE FOR USE WITH ELECTRICAL SURGE SUPPRESSOR

[75] Inventors: Stephen Geishecker, East Walpole, Mass.; Theresa A. Howarth, Pawtucket; Vincent F. Suttmeier, Harrisville, both of R.I.

[73] Assignee: Texas Instruments Incorporated, Dallas, Tex.

[21] Appl. No.: 573,903

[22] Filed: Dec. 18, 1995

Related U.S. Application Data

[63] Continuation of Ser. No. 165,047, Dec. 10, 1993, abandoned.

[51] Int. Cl.[6] .......... H02H 3/20

[52] U.S. Cl. .......... 361/118; 361/111; 361/119; 337/29; 337/32

[58] Field of Search .......... 361/111, 118, 361/119, 124; 337/32, 28, 29, 34

[56] References Cited

U.S. PATENT DOCUMENTS

| | | | |
|---|---|---|---|
| Re. 30,724 | 8/1981 | Klayum et al. | 361/124 |
| 3,543,207 | 11/1970 | Kawiecki | 337/28 |
| 3,886,411 | 5/1975 | Klayum et al. | 361/119 |
| 3,947,730 | 3/1976 | DeLuca et al. . | |
| 4,009,421 | 2/1977 | Splitt et al. | 361/119 |
| 4,150,414 | 4/1979 | Pagliuca | 361/124 |
| 4,303,959 | 12/1981 | Roberts et al. | 361/124 |
| 4,320,435 | 3/1982 | Jones | 361/119 |
| 4,351,015 | 9/1982 | Smith | 361/119 |
| 4,394,704 | 7/1983 | Jones | 361/119 |
| 4,424,546 | 1/1984 | Smith . | |
| 4,447,848 | 5/1984 | Smith | 361/124 |
| 4,533,971 | 8/1985 | Smith | 361/119 |
| 4,649,456 | 3/1987 | De Luca et al. | 361/119 |
| 4,701,825 | 10/1987 | Pagliuca | 361/119 |
| 4,737,880 | 4/1988 | Mickelson | 361/119 |
| 4,796,150 | 1/1989 | Dickey et al. | 361/119 |
| 4,944,003 | 7/1990 | Meyerhoefer et al. | 361/119 |
| 5,154,639 | 10/1992 | Knoll et al. | 361/119 |
| 5,157,580 | 10/1992 | Hegner et al. | 361/119 |

*Primary Examiner*—Jeffrey A. Gaffin
*Assistant Examiner*—Sally C. Medley
*Attorney, Agent, or Firm*—Russell E. Baumann; Richard L. Donaldson; Rene' E. Grossman

[57] ABSTRACT

A failsafe device is shown in which a solid state surge suppressor (12) is mounted thermally coupled to a heat transfer element (42). A shorting bar (60) is attached to element (42) by a thin layer of solder chosen to melt at a selected maximum temperature. A spring (70) places a preload on the shorting bar and, upon melting the solder, rapidly moves the shorting bar into engagement with leads (T, G, R) attached to the surge suppressor to short the T and R leads to ground (G).

22 Claims, 5 Drawing Sheets

FAILSAFE DEVICE FOR USE WITH ELECTRICAL SURGE SUPPRESSOR

This application is a Continuation of application Ser. No. 08/165,047, filed Dec. 10, 1993 now abandoned.

BACKGROUND OF THE INVENTION

This invention relates generally to solid state electrical surge suppressors and more particularly to a device for providing failsafe protection for telecommunication equipment with which such suppressors are used.

Solid state surge protection systems conventionally employ a surge protection device having a semiconducting element disposed between a pair of electrodes. This element is arranged in the circuit to selectively conduct electrical energy between the tip line and ground and/or the ring line and ground. For example, in the event a telecommunication circuit experiences an electrical surge as a result of lightning or A.C. line cross or the like in the circuit, the system is designed to shunt voltage from and thereby protect telecommunication equipment connected in the circuit from damage due to the surge condition. On occasion, the circuit may experience an even greater electrical surge which results in destruction of the semiconducting element so that the circuit components and telecommunication equipment would not thereafter be protected against electrical surge conditions. Accordingly, conventional surge protection systems typically incorporate means designed to move the electrodes into engagement with each other following destruction of the semiconducting element to thereby maintain a short circuit condition between the electrodes to protect the circuit and telecommunication equipment coupled to the circuit against subsequently occurring transient surge conditions until such time as the semiconducting element is replaced. An example of such a surge protection device is shown and described in copending application Ser. No. 07/987,038 assigned to the assignee of the present invention.

According to applicable standards, a surge protector when mounted in a telecommunications line protector unit (TLPU) package must meet a number of test requirements including the ability to conduct defined tip to ground and ring to ground currents simultaneously and other defined currents, tip to ground or ring to ground, for specified durations without causing a safety hazard or propagating a fire. At the conclusion of the tests all TLPUs must either be shorted to ground or have a voltage limiting of less than a specified amount at a certain rate of rise.

It is an object of the present invention to provide a failsafe device that can be used with a surge suppressor which will short to ground under any of the required conditions but which will remain unaffected when subjected to less severe fault conditions that the surge suppressor is designed to handle.

Briefly, in accordance with the invention, a failsafe device for use with a telecommunications surge suppressor having electrical leads, including a ground lead, comprises a heat transfer member thermally coupled to the surge suppressor with a shorting bar attached to the heat transfer member by a layer of solder which is chosen to melt at a selected temperature. The shorting bar is aligned with the electrical leads and a force is applied to the shorting bar in the direction of the electrical leads with a tensional force applied to the solder layer so that if the temperature of the solder reaches the melting point due to a fault condition or the like the shorting bar will be released and will be rapidly forced from its first position in engagement with the heat transfer member to a second position in engagement with the electrical leads to thereby provide a short circuit to ground. According to a feature of the invention, the shorting bar is provided with triangular portions bent out of the plane of the bar in order to break through any oxide layer or the like formed on the leads. According to another feature of the invention a triangular groove is formed in a housing member to serve as a guide passage for one of the triangular portions of the shorting bar to control the side-to-side position of the shorting bar as well as to maintain a selected orientation of the bar so that each of the triangular portions will engage a respective lead. According to another feature of the invention, the spring force is applied to the bar at a location to ensure equal distribution of the force on each of the leads. According to another feature of the invention the leads are received in mating grooves between two housing members with one housing member having a support surface for the leads in alignment with the position of the shorting bar. According to yet another feature, a spring is used to provide the shorting force and, in the extended condition, when the shorting bar is in engagement with the leads the spring provides sufficient force, for example, a typical force of approximately 0.75 pounds.

DETAILED DESCRIPTION OF THE PREFERRED EMBODIMENTS

Figure 1:
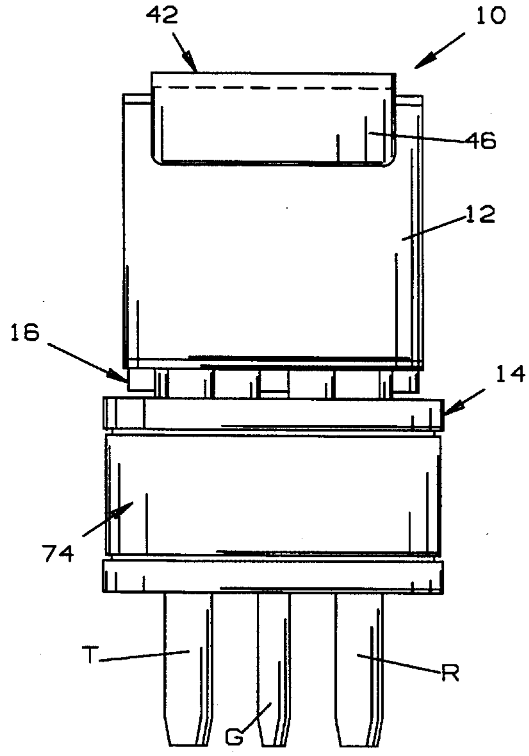
FIG. 1 is a front elevational view of a failsafe device made in accordance with the invention shown with a telecommunication surge protector mounted therein.
Figure 2:
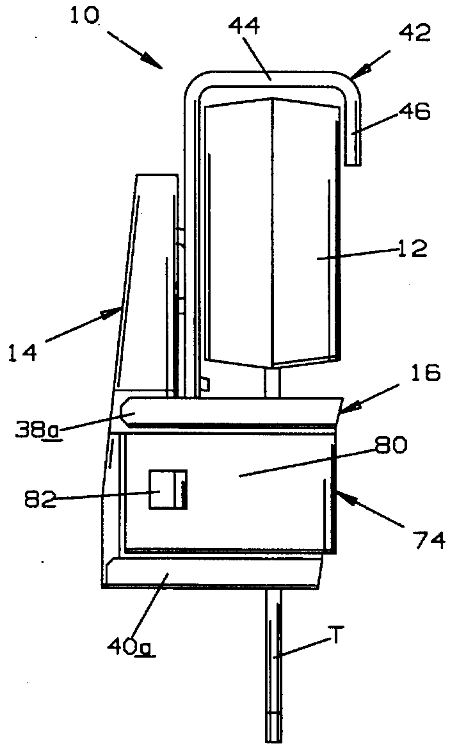
FIG. 2 is a side elevation of the device shown in FIG. 1.
Figure 3:
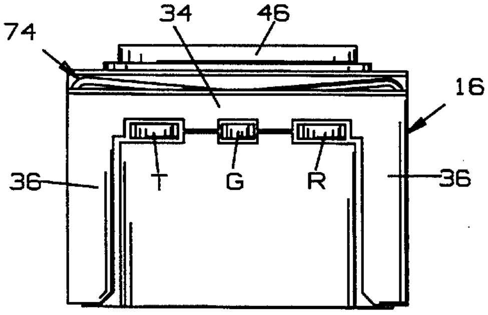
FIG. 3 is a bottom plan view of the device shown in FIG. 1.
Figure 4:
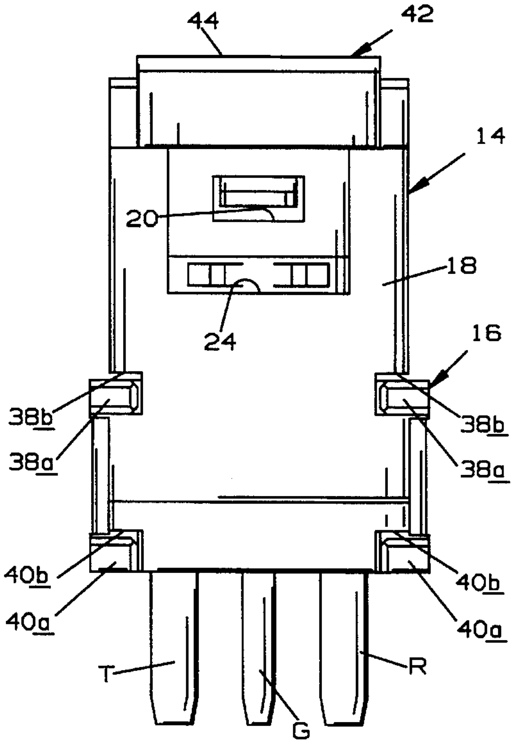
FIG. 4 is a rear elevation of the device shown in FIG. 1.
Figure 5:
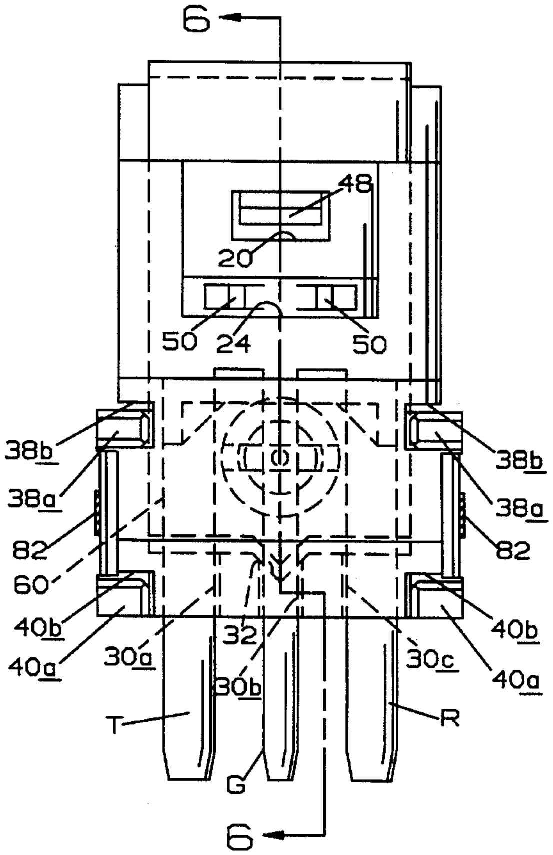
FIG. 5 is a view similar to FIG. 4 but showing certain internal parts and features in dashed lines.

Failsafe device 10 made in accordance with the invention is adapted to receive a surge protector device having device leads and a ground lead, such as a telecommunication surge suppressor 12 shown in FIG. 1. Further details of surge suppressor 12 may be obtained in application Ser. No.

07/987,038, referenced above, which is incorporated herein by this reference. Failsafe device 10 cooperates with such protector device to monitor the external temperature thereof and to short the device leads to ground in the event of excessive temperature conditions of the device.

Failsafe device 10 comprises first and second housing members 14, 16 each formed with a plurality of aligned grooves adapted to receive respective leads T, G, R of the surge protector 12, or such other solid state device.

Figure 11:
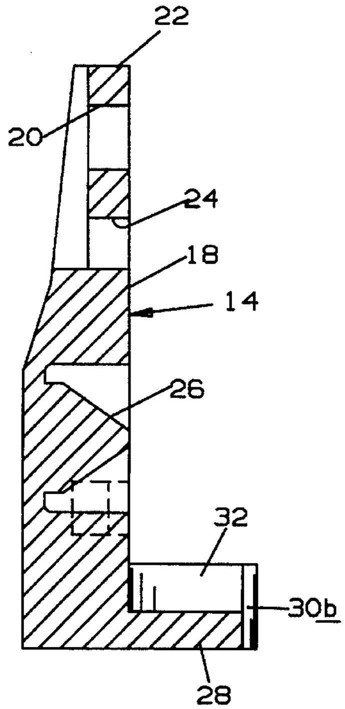
FIG. 11 is a cross sectional view taken through another housing portion used in the failsafe device of FIG. 1.
Figure 12:
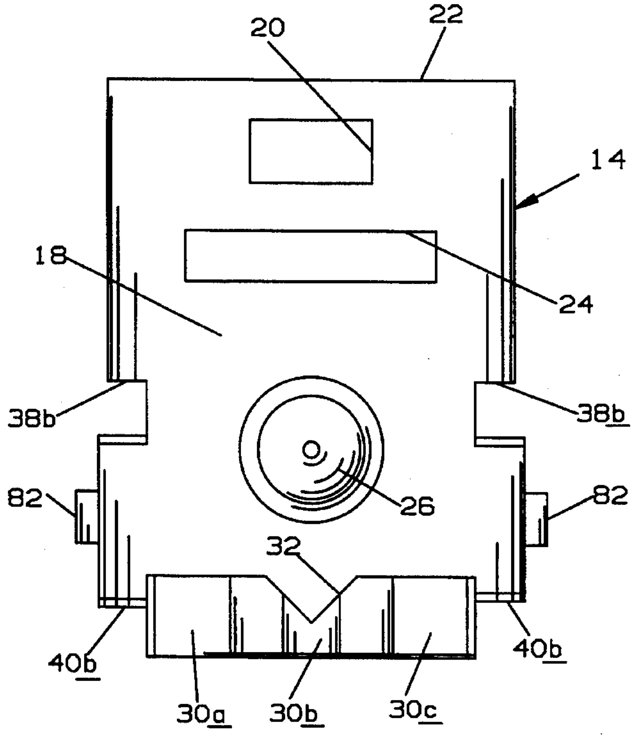
FIG. 12 is a front elevational view of the FIG. 11 housing member.

Housing member 14, see FIGS. 11 and 12, is formed of electrically insulating material, such as a conventional moldable resin, and has an upwardly extending wall 18 having a laterally extending first slot 20 formed adjacent the top free distal end 22 of wall 18 and a laterally extending second slot 24 formed intermediate slot 20 and a spring receiving seat 26. A platform 28 projects horizontally outwardly from the lower end of wall 18 and is provided with a plurality of spaced vertically extending grooves **30*a*, 30*b* and 30*c* at its free distal end. Platform 28 is also formed with a horizontally extending, generally V-shaped groove 32** for a purpose to be described below.

Figure 7:
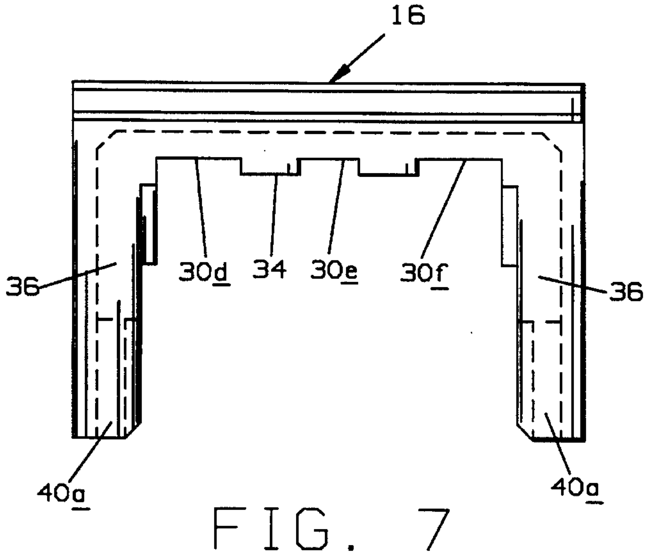
FIG. 7 is a bottom view of a housing portion used in the failsafe device of FIG. 1.
Figure 8:
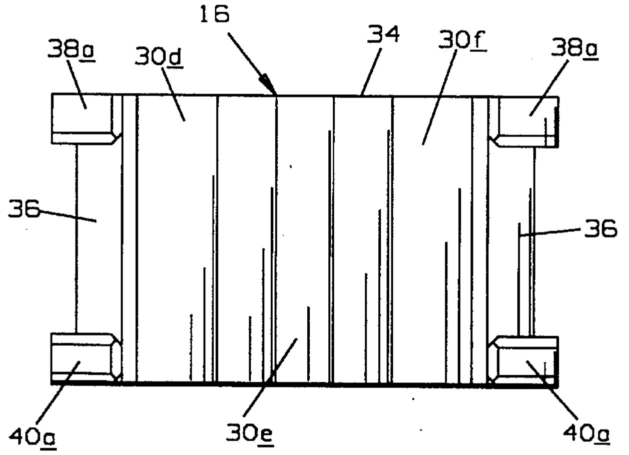
FIG. 8 is a rear view of the FIG. 7 housing portion.

Housing member 16, see FIGS. 7 and 8, is generally U-shaped having a central wall portion 34 formed with vertically extending grooves **30*d*, 30*e* and 30*f* adapted to be in alignment with respective grooves 30*a*, 30*b* and 30*c* in housing member 14 when the housing members are attached to one another. Housing member 16 has sidewalls 36 and upper legs 38*a* and lower legs 40*a* extending outwardly, horizontally from each side of wall 36. Legs 38*a* and 40*a* are adapted to be received in respective recessed portions 38*b*, 40*b* of housing member 14**.

Figure 6:
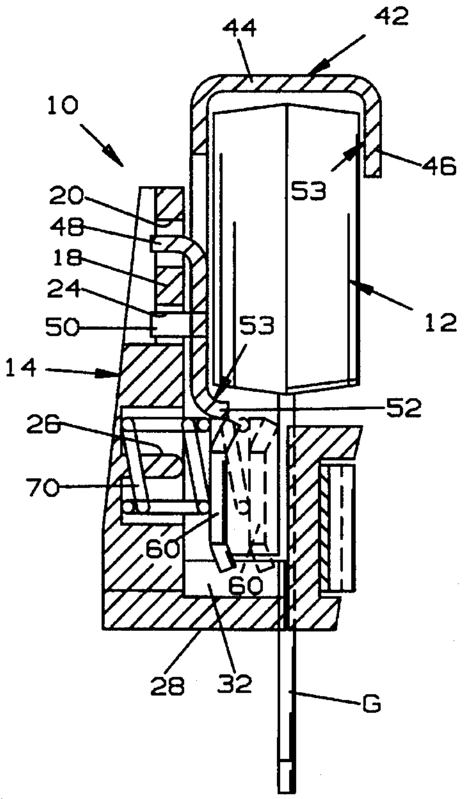
FIG. 6 is a cross sectional view taken on line 6—6 of FIG. 5.
Figure 9:
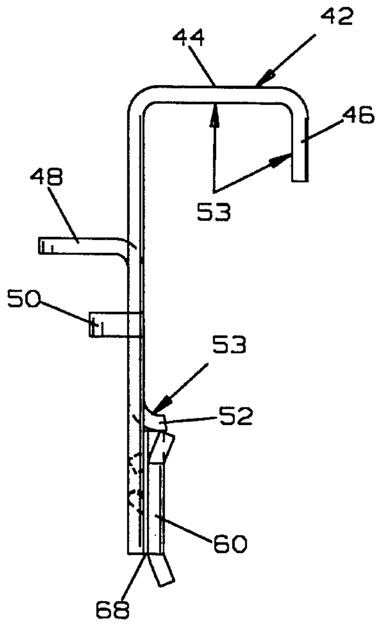
FIG. 9 is a side view of a heat transfer member and shorting bar disposed thereon used in the failsafe device made in accordance with the invention.
Figure 10:
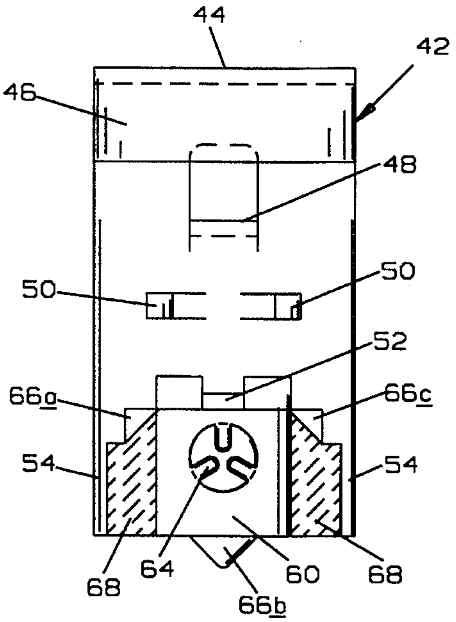
FIG. 10 is a front elevation of the FIG. 9 heat transfer member and shorting bar.
Figure 13:
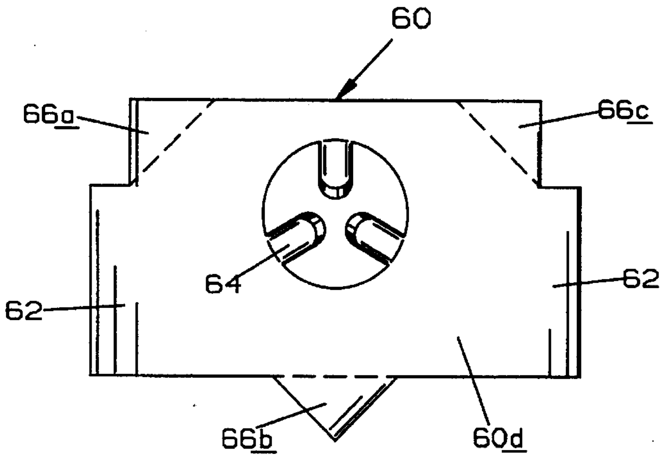
FIG. 13 is a front elevational view of the shorting bar shown in FIGS. 9 and 10.
Figure 14:
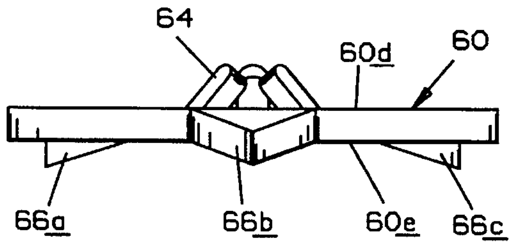
FIG. 14 is a bottom plan view of the FIG. 12 shorting bar.
Figure 15:
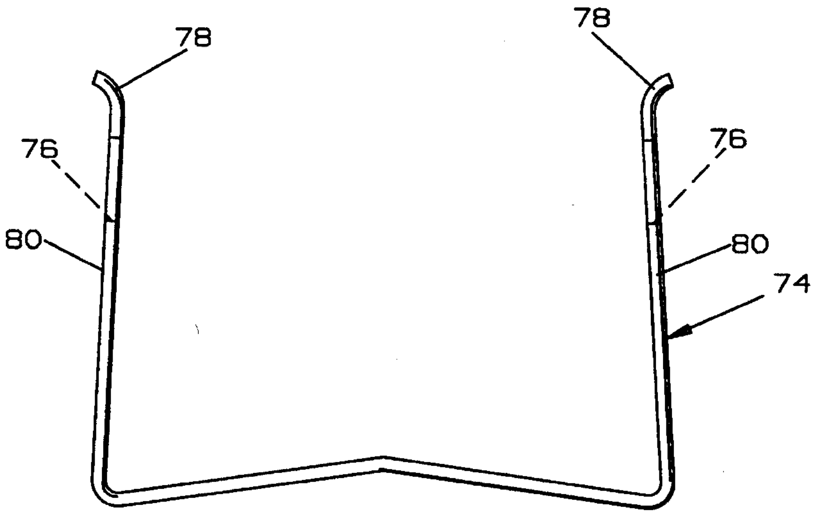
FIG. 15 is a top plan view of a spring clip used to maintain the housing parts attached to one another.

With particular reference to FIGS. 6 and 10, heat transfer member 42 is shown received on wall 18 and is formed from a strip of solderable, thermally conductive material, such as beryllium copper, and has a horizontally extending upper portion 44 formed with a downwardly extending lip 46 adapted to fit over the top portion of a surge suppressor 12 in heat transfer relation therewith. A first horizontally extending tab 48 extends from member 42 in a direction opposite to that of portion 44 and is adapted to be received in first slot 20 of housing member 14. Spaced tabs 50 are struck from plate member 42 and are adapted to be received in second slot 24 of housing member 14, generally at opposite ends of the slot. Tabs 48, 50 interfitting in slots 20, 24 maintain heat transfer member 42 in a preselected location relative to the housing. Member 42 is formed with an inwardly extending tab 52 which, along with upper portion 44 and lip 46, serve as a seat 53 for suppressor 12. Member 42 is also formed with spaced, downwardly extending legs 54 at either side which serve as attachment surfaces for shorting bar 60 (see FIGS. 9 and 10). Shorting bar 60, best seen in FIGS. 13 and 14 is formed of electrically conductive material such as brass, preferably nickel plated for corrosion protection and provided with an outer, solderable layer such as tin. Bar 60 has opposite side portions 62 adapted to overlie at least a portion of legs 54, and is provided with a central spring seat portion 64 on a first side **60*d*. Seat portion 64 is shown comprising a plurality of tabs struck from the body of bar 60; however, if desired, the bar could be deformed at 64 to form a protrusion to serve as the spring seat. Triangular portions 66*a*, 66*b* and 66*c* are bent out of the plane in which the shorting bar lies to provide pointed surface portions on opposed side 60*e* of the shorting bar for a reason to be explained below. Shorting bar 60 is placed on heat transfer member 42 and side 60*a* is attached to legs 54 of member 42 forming a sandwich by a thin layer of solder as shown at 68 of FIG. 10. The solder has a composition chosen to melt at a selected temperature. FIGS. 9 and 10 show heat transfer member 42 with shorting bar 60 disposed thereon with opposed side portions of one face surface on side 60*d* of the shorting bar attached to legs 54 of heat transfer member 42 and with the opposite face surface of side 60*e*** of the shorting bar facing away from the heat transfer member.

A coil spring 70 (FIG. 6) is placed between seat 26 of housing member 14 and seat 64 of shorting bar 60 disposed between legs 54 of heat transfer member 42 and is adapted to placed a force on shorting bar 60 toward leads T, G and R. In assembling failsafe device 10, a surge suppressor 12 is placed in seat 53 of heat transfer member 42 after shorting bar 60 has been soldered to member 42 and this assembly is then placed in housing member 14 with tabs 48, 50 received in slots 20, 24 and shorting bar 60 compressing spring 70 to place a selected preload thereon. Leads T, G and R are received in respective grooves **30*a*, 30*b* and 30*c* and the housing member 16 is interfitted with housing member 14 with leads T, G and R received in respective grooves 30*d*, 30*e* and 30*f* with central wall portion 34 providing a stop or support surface for the leads. The housing members 14, 16 are suitably affixed to one another as by using generally U-shaped spring clip 74. Spring clip 74 is formed with an aperture 76 adjacent to the free distal end 78 of each of its legs 80. Clip 74 is received around housing member 16 and is attached to housing member 14 by forcing the distal end portions of each leg over a projection 82 formed on each side of housing member 14**.

A suitable solder 68 for use with telecommunication surge suppressor 12 comprises, by weight, 58% bismuth and 42% tin which melts at approximately 138° C. In the event that the temperature of surge suppressor 12 increases so that the heat conducted through heat transfer member 42 causes the temperature of the solder to reach 138° C. then the solder will melt allowing spring 70 to rapidly move shorting bar 60 within the recess formed between platform 28, wall 18 and wall 34 into engagement with the leads of suppressor 12 with portion **66*b* being guided by triangular groove 32 so that it firmly engages the G (ground) lead. Portion 66*b* is preferably pointed so that it will penetrate through any oxide layer or the like which may form over time on the lead. Likewise, points 66*a* and 66*c* will engage respective leads T (tip) and R (ring) to short the T and R leads to ground and thereby protect the telecommunications equipment from subsequently received surges. Spring 70 is centrally located relative to points 66*a*, 66*b* and 66*c* so that an equal force is placed on each of the leads. If surge suppressor 12 has, in the meantime, ruptured due to the excessive heat level lip 46 serves to contain the suppressor in seat 53**.

Spring 70 is designed to provide sufficient force in the normal operating position in order to move the shorting bar into engagement with leads T, G and R when released by the melted solder upon over-temperature conditions while at the same time not applying more tensional force to the solder layer than it is capable of withstanding in the normal operating condition. Additionally, spring 70 provides sufficient force when in the extended position with shorting bar 60 released and in engagement with leads T, G and R to ensure that the shorting current is maintained. For example, a force on the order of approximately 1.2 pounds in the normal operating position and approximately 0.75 pounds in the extended position, has been found to be satisfactory.

By means of the invention, the failsafe device monitors the external temperature of the surge suppressor, integrating it with time, power and surface area, and when a selected critical threshold temperature is reached at the solder layer which acts as a trigger mechanism the shorting bar is released and allowed to move to short both the tip and ring device leads to ground. It will be appreciated that the device made in accordance with the invention could be used in conjunction with other voltage surge suppressors or other solid state or gas tube or the like components in various package configurations. Although a two-part housing is disclosed, it will be understood that it is within the purview of the invention to use various housing configurations, for example, the housing could be formed as a single member and the components could be telescopically received therein.

While the invention has been described in what is presently considered to be a preferred embodiment, many modifications and variations will become apparent to those skilled in the art. It is intended, therefore, that the invention be limited only by its true spirit and scope is set forth in the appended claims.

We claim:

1. A failsafe device for use with a telecommunications surge suppressor having a ground lead and at least one other lead, the device comprising a housing formed of electrically insulative material, the housing having a wall portion, a spring seat formed in the wall portion, a thermally conductive member having a surge suppressor receiving seat to receive a surge suppressor in heat transfer relation with the thermally conductive member received in the housing, a relatively rigid electrically conductive shorting bar having opposed first and second face surfaces, the first face surface facing the spring seat and being soldered to the thermally conductive member, and a spring received on the spring seat, the spring engaging the first face surface of the shorting bar and placing a force on the shorting bar in a direction to move the shorting bar from a first position in engagement with the thermally conductive member to a second position at which the second face surface engages the leads of a surge suppressor received in the surge suppressor receiving seat.

2. A failsafe device according to claim 1 in which the housing includes a first member comprising the wall portion and further including a second member comprising a central portion, the central portion of the housing aligned with the leads, the leads being located intermediate the central portion and the shorting bar and being captured between the first and second housing members.

3. A failsafe device according to claim 2 further including means to attach the first and second housing members to one another comprising a spring clip.

4. A failsafe device according to claim 3 including projections formed on the first housing member, the spring clip formed with apertures, each aperture adapted to receive a respective projection.

5. A failsafe device according to claim 1 in which the thermally conductive member has an upper wall portion and a wall extending horizontally from a top portion of the upper wall portion to a free distal end and a lip extending downwardly from the free distal end, the horizontal wall and lip extending over and down a surge suppressor received in the surge suppressor seat.

6. A failsafe device according to claim 5 in which an aperture is formed in the wall portion of the housing and the thermally conductive member has a tab extending from the member which is received in the aperture.

7. A failsafe device according to claim 1 including a spring seat formed on the shorting bar.

8. A failsafe device according to claim 1 in which the shorting bar has pointed sections adapted to engage respective leads.

9. A failsafe device according to claim 8 in which the housing has a bottom wall extending outwardly from the wall portion, the bottom wall formed with a guide groove extending in the said direction and one of the pointed sections is received in the guide groove in order to maintain a selected orientation of the shorting bar during movement from the first position to the second position.

10. A failsafe device according to claim 1 in which the solder is selected to melt at approximately 138° C.

11. A failsafe device according to claim 9 in which the spring has approximately 0.75 pounds force exerted on the shorting bar when the shorting bar is in engagement with the leads in the extended position.

12. A failsafe device according to claim 1 in which the solder is composed, by weight, of approximately 58% bismuth and 42% tin.

13. A failsafe device according to claim 1 in which the thermally conductive member has first and second legs spaced from one another and disposed on either side of the spring seat, the shorting bar being soldered to the first and second legs.

14. A failsafe device for use with a telecommunications surge suppressor having a body and ring, tip and ground leads extending from the body, the device comprising a first housing member formed of electrically insulative material, the housing having a bottom wall with first and second ends, a wall extending upwardly from the second end to an upper end portion, a spring seat formed in the upwardly extending wall and a plurality of spaced lead receiving grooves formed in the first end of the bottom wall, a thermally conductive member having an upper wall portion and spaced leg portions extending downwardly from the upper wall portion, the thermally conductive member received in the first housing member with the upper wall portion received on the upwardly extending wall of the first housing member, a relatively rigid electrically conductive shorting bar having first and second opposed face surfaces, the first face surface extending between the leg portions in alignment with the spring seat and being soldered to the leg portions, a spring received on the spring seat, the spring in engagement with and placing a force on the first face surface of the shorting bar in a direction to move the shorting bar away from the leg portions toward the first end of the bottom wall, the thermally conductive member adapted to receive a surge suppressor in heat transfer relation therewith on the upper wall portion of the themally conductive member and with the ring, tip and ground leads received in respective grooves formed in the bottom wall so that movement of the shorting bar toward the first end of the bottom wall results in the second face surface engaging the ring, tip and ground leads, a second generally U-shaped housing member formed of electrically insulative material, the second housing member having a central portion disposed between first and second legs, the legs having distal end portions disposed adjacent the upwardly extending wall of the first housing member and with the central portion engaging the first end of the bottom wall closing the spaced lead receiving grooves, the central portion preventing dislocation of the leads of the suppressor when the shorting bar is moved toward the first end of the bottom wall and means to attach the first and second housing members to one another.

15. A failsafe device according to claim 14 including grooves formed in back of central portion of U-shaped second housing member in alignment with respective grooves in the first end of the bottom wall.

16. A failsafe device according to claim 14 in which the solder is selected to melt at approximately 138° C.

17. A failsafe device according to claim 16 in which the spring has approximately 0.75 pounds force exerted on the shorting bar when the shorting bar is in engagement with the leads in the extended position.

18. A failsafe device according to claim 14 in which the solder is composed, by weight, of approximately 58% of bismuth and 42% tin.

19. A failsafe device for use with a telecommunication surge suppressor having a ground lead and at least one other lead, comprising a heat transfer member mounted in heat conductive relationship with the suppressor, an electrically conductive shorting bar having opposed first and second face surfaces movable between a first position in which the first face surface is in engagement with the heat transfer member and a second position in which the second face surface is in engagement with the leads of the suppressor, the first face surface of the shorting bar being soldered to the heat transfer member at the first position, and means placing a force on the shorting bar in a direction extending from the first position toward the second position and placing a tensional force on the solder.

20. A failsafe device according to claim 17 in which the solder is selected to melt at approximately 138° C.

21. A failsafe device according to claim 17 in which the means placing a force on the shorting bar comprises a spring.

22. A failsafe device according to claim 17 in which a force of approximately 0.75 pounds of force is placed on the shorting bar in the second position.

* * * * *